United States Patent
Ejiri et al.

(10) Patent No.: US 6,999,255 B2
(45) Date of Patent: Feb. 14, 2006

(54) MAGNETIC RECORDING AND REPRODUCING SYSTEM AND MAGNETIC RECORDING MEDIUM USED THEREIN

(75) Inventors: Kiyomi Ejiri, Kanagawa (JP); Takeshi Harasawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 257 days.

(21) Appl. No.: 10/290,193

(22) Filed: Nov. 8, 2002

(65) Prior Publication Data

US 2003/0142431 A1 Jul. 31, 2003

(30) Foreign Application Priority Data

Nov. 9, 2001 (JP) .................................... P.2001-344577
Mar. 14, 2002 (JP) .................................... P.2002-070279

(51) Int. Cl.
*G11B 5/02* (2006.01)

(52) U.S. Cl. ........................................ 360/5.5; 360/131
(58) Field of Classification Search ............. 428/694 T, 428/694 B, 694 BR, 694 BA, 694 SG, 694 BH, 428/694 TR; 360/131, 55, 119

See application file for complete search history.

(56) References Cited

U.S. PATENT DOCUMENTS

| 4,895,758 | A | * | 1/1990 | Sakemoto et al. | .......... 428/323 |
| 6,017,605 | A | | 1/2000 | Yamazaki et al. | |
| 6,497,948 | B1 | * | 12/2002 | Ejiri et al. | .......... 428/323 |
| 6,713,149 | B1 | * | 3/2004 | Harasawa et al. | .......... 428/65.3 |

FOREIGN PATENT DOCUMENTS

JP 2001-67649 A 3/2001

* cited by examiner

*Primary Examiner*—Alan T. Faber
(74) *Attorney, Agent, or Firm*—Sughrue Mion, PLLC

(57) ABSTRACT

A magnetic recording and reproducing system, including recording a signal on a magnetic recording medium by an inductive head and reproducing the signal by a magneto resistance head. The gap length of the inductive head is 0.3 $\mu$m or less. The maximum particle diameter of ferromagnetic powder is from $\frac{1}{10}$ to $\frac{1}{2}$ of the gap length, the minimum particle diameter of the powder is from $\frac{1}{100}$ to $\frac{1}{5}$ of the gap length, and the thickness of a magnetic layer is from $\frac{1}{10}$ to $\frac{1}{2}$ of the gap length. The average particle size of the powder is from 10 to 35 nm, the tabular ratio is from 2 to 6, the squareness ratio of in-plane of the magnetic layer is from 0.5 to 0.9 in the longitudinal direction, and from 0.2 to 0.6 in the thickness direction, and the thickness of the magnetic layer is from 0.01 to 0.2 $\mu$m.

12 Claims, No Drawings

MAGNETIC RECORDING AND REPRODUCING SYSTEM AND MAGNETIC RECORDING MEDIUM USED THEREIN

FIELD OF THE INVENTION

The present invention relates to a high density recording and reproducing system and a magnetic recording medium, more specifically relates to a magnetic recording medium which exhibits excellent magnetic characteristics, an excellent S/N ratio in a high density recording region and excellent durability when used in a system of reproducing with a magneto resistance head (an MR head).

BACKGROUND OF THE INVENTION

In the field of the magnetic disc, a floppy disc drive using a 2 MB MF-2HD floppy disc using Co-modified iron oxide has been generally loaded in a personal computer. However, along with the increase in the amount of data by processing image data, the capacity thereof has become insufficient and the increase of the capacity of the floppy disc has been demanded.

In the field of the magnetic tape also, along with the prevalence of the office computer, such as minicomputers, personal computers and work stations, magnetic tapes for recording computer data as external storage (a so-called backup tape) have been eagerly studied in recent years. For putting magnetic tapes for such usage to practical use, the improvement of recording capacity has been strongly demanded conjointly with the miniaturization of a computer and the increase of information processing performance (i.e., the increase of throughput) for achieving high capacity recording and miniaturization.

Magnetic recording media comprising a nonmagnetic support having coated thereon a magnetic layer comprising an iron oxide, a Co-modified iron oxide, $CrO_2$, a ferromagnetic metal powder, or a hexagonal ferrite powder dispersed in a binder have been conventionally widely used. In recent years, a magneto resistance head (an MR head) has come to be used for hard disc apparatus in a system using a flexible recording medium. Since an MR head is high sensitivity and capable of obtaining sufficient reproduction output, when a magnetic substance which is relatively low in saturation magnetization as and fine particle is used, a high C/N ratio can be obtained by the reduction of noise. For instance, an example of the reproduction with an MR head by using a barium ferrite (BaFe) fine powder is disclosed in Japanese Patent (Application) Laid-Open No. 302243/1998.

In a recording system of high recording density (in particular, track recording density), it is necessary to optimize the relationship between recording conditions and the medium, besides an MR head is used at reproduction. In high track recording density, the gap of recording heads is generally made small for reducing the influences such as recording demagnetization and bit shift at recording, by which, however, recording magnetic field narrows and overwriting and thickness loss are traded off. Further, since the width of magnetic flux revolution narrows, the influence of turbulence of magnetization in a magnetization transition region cannot be negligible, which results in the loss of S/N ratio and the degradation of overwriting aptitude.

SUMMARY OF THE INVENTION

An object of the present invention is to provide a recording and reproducing system of combining an inductive head and an MR head, which realizes excellent electromagnetic characteristics, markedly improved S/N ratio in high density recording region, excellent durability, and at the same time high reproductivity. Another object of the present invention is to provide a coating type magnetic recording medium (i.e., a magnetic recording particulate medium) which is low in noise, excellent in high density characteristics and durability when used in a recording and reproducing system combined with an MR head.

As a result of eager investigation, the present inventors have found that the above objects of the present invention can be achieved by combining an inductive head having a specific gap length with a magnetic recording medium having a magnetic layer containing a ferromagnetic powder having specific physical properties and having a specific thickness. Thus, the present invention has been attained.

In the present invention, the first invention is a magnetic recording and reproducing system-comprising recording a signal on a magnetic recording medium by an inductive head and reproducing the signal by a magneto resistance head, wherein the magnetic recording medium comprises a support having thereon a magnetic layer comprising a ferromagnetic powder and a binder, the gap length of the inductive head is 0.3 µm or less, the maximum particle diameter of the ferromagnetic powder is from $\frac{1}{10}$ to $\frac{1}{2}$ of the gap length of the inductive head, the minimum particle diameter of the ferromagnetic powder is from $\frac{1}{100}$ to $\frac{1}{5}$ of the gap length of the inductive head, and the thickness of the magnetic layer is from $\frac{1}{10}$ to $\frac{1}{2}$ of the gap length of the inductive head.

Another invention in the first invention is a magnetic recording medium for use in a magnetic recording and reproducing system comprising recording a signal by an inductive head having a gap length of 0.3 µm or less and reproducing the signal by a magneto resistance head, wherein the magnetic recording medium has a magnetic recording layer comprising a ferromagnetic powder and a binder, the maximum particle diameter of the ferromagnetic powder is from $\frac{1}{10}$ to $\frac{1}{2}$ of the gap length of the inductive head, the minimum particle diameter of the ferromagnetic powder is from $\frac{1}{100}$ to $\frac{1}{5}$ of the gap length of the inductive head, and the thickness of the magnetic layer is from $\frac{1}{10}$ to $\frac{1}{2}$ of the gap length of the inductive head.

The preferred embodiments of the above invention are as follows.

(1) The ferromagnetic powder is a ferromagnetic alloy powder comprising Fe having an average long axis length of from 20 to 100 nm and an average acicular ratio of from 3 to 10 as a main component.

(2) The ferromagnetic powder is a hexagonal ferrite powder having an average tabular diameter of from 10 to 40 nm and an average tabular ratio of from 3 to 10.

(3) The magnetic recording medium is a magnetic recording medium wherein a magneto resistance head used for reproduction has an elemental thickness of 30 nm or less and the minimum particle diameter of the ferromagnetic powder is ½ or less of the elemental thickness.

Further, in the present invention, the second invention is a magnetic recording and reproducing system comprising recording a signal on a magnetic recording medium by an inductive head and reproducing the signal by a magneto resistance head, wherein the magnetic recording medium comprises a support having thereon a magnetic layer comprising a ferromagnetic powder and a binder, the gap length (gl) of the inductive head is 0.3 µm or less, the average particle size of the ferromagnetic powder is from 10 to 35 nm, the tabular ratio is from 2 to 6, the squareness ratio of in-plane of the magnetic layer is from 0.5 to 0.9 in the longitudinal direction, and from 0.2 to 0.6 in the thickness direction, and the thickness of the magnetic layer is from 0.01 to 0.2 μm.

Another invention in the second invention is a magnetic recording medium for use in a magnetic recording and reproducing system comprising recording a signal by an inductive head having a gap length (gl) of 0.3 μm or less and reproducing the signal by a magneto resistance head, wherein the magnetic recording medium comprises a support having thereon a magnetic layer comprising a ferromagnetic powder and a binder, the average particle size of the ferromagnetic powder is from 10 to 35 nm, the tabular ratio is from 2 to 6, the squareness ratio of in-plane of the magnetic layer is from 0.5 to 0.9 in the longitudinal direction, and from 0.2 to 0.6 in the thickness direction, and the thickness of the magnetic layer is from 0.01 to 0.2 μm.

The preferred embodiments of the above invention are as follows.

(1) The ferromagnetic powder used in the magnetic recording system is a hexagonal ferrite powder and the magnetic recording and reproducing system uses the ferromagnetic powder.

(2) The electrical resistance of the surface of the magnetic layer of the magnetic recording medium is $1 \times 10^9$ Ω/sq and the magnetic recording and reproducing system uses the magnetic recording medium.

(3) The magnetic recording medium is a magnetic recording medium wherein a magneto resistance head used for reproduction has an elemental thickness of 30 nm or less and the minimum particle diameter of the ferromagnetic powder is ½ or less of the elemental thickness.

DETAILED DESCRIPTION OF THE INVENTION

In the present invention, the maximum particle diameter (Dmax) of a ferromagnetic powder in represented by the arithmetic mean of the lengths of long axes constituting the powder (i.e., long axis length), i.e., the average long axis length when the shape of the powder is acicular, spindle-like or columnar (provided that the height is greater than the longest diameter of the base), and is represented by the arithmetic mean of the longest diameter of the tabular surface or the base (i.e., the tabular diameter), i.e., the average tabular diameter when the shape of the powder is tabular or columnar (provided that the thickness or height is smaller than the longest diameter of the tabular surface or the base).

Further, the minimum particle diameter (Dmin) of a ferromagnetic powder is represented by the arithmetic mean of the lengths of short axes (the longest short axis orthogonal to long axes) constituting the powder (i.e., short axis length), i.e., the average short axis length when the shape of the powder is acicular, spindle-like or columnar (provided that the height is greater than the longest diameter of the base), and is represented by the arithmetic mean of the maximum value of the thickness or height (i.e., the tabular thickness), i.e., the average tabular thickness when the shape of the powder is tabular or columnar (provided that the thickness or height is smaller than the longest diameter of the tabular surface or the base).

Each of the above mean values is measured with 500 particles by high resolution transmission electron microphotographs and an image analyzer.

Taking the gap length of an inductive head as gl, it is necessary that the system and the magnetic recording medium according to the present invention should satisfy the following relationships: $gl \leq 0.3$ μm, $gl/10 \leq Dmax \leq gl/2$ (i.e., $2Dmax \leq gl \leq 10Dmax$), $gl/100 \leq Dmax \leq gl/5$ (i.e., $5Dmin \leq gl \leq 100Dmin$), and $gl/10 \leq t \leq gl/2$ (i.e., $2t \leq gl \leq 10t$), wherein t represents the thickness of a magnetic layer.

The average acicular ratio of the powder is the arithmetic mean of the value of (long axis length/short axis length) of each particle. In the above definition of particle sizes, the short axis length is the length of short axis constituting the particle in the case of (1), the thickness or height in the case of (2), and since a long axis and a short axis cannot be discriminated in the case of (3), (long axis length/short axis length) is taken as 1 for convenience.

When the shape of a particle is specific, e.g., in the case of (1) in the above definition of particle sizes, the average particle size is an average long axis length, the average particle size is an average tabular size and the arithmetic mean of (long axis length/short axis length) is an average tabular ratio in the case of (2). In the case of (3), the average powder size is an average particle size, but all are generically called as average particle size in the present invention. In particle size measurement, standard deviation/average value expressed in percentage is called a variation coefficient.

The present invention in described below with every constituent.

Magnetic Layer

The magnetic recording medium in the first invention may have a magnetic layer directly provided on a support, or a nonmagnetic lower layer may be provided between a magnetic layer and a support. Since the thickness of a magnetic layer is as thin as from ⅒ to ½ of the gap length of a recording head, substantially from 30 to 150 nm, multilayer constitution using a nonmagnetic lower layer is preferred.

The coercive force (Hc) of a magnetic layer is preferably from 158 to 350 kA/m (2,000 to 4,430 Oe), and more preferably from 170 to 280 kA/m (2150 to 3540 Oe). In the distribution of magnetization, it is preferred to define that factors subject to magnetic flux revolution by applied magnetic field of 80 kA/m or less be at most less than 1%, more preferably 0.7% or less, and particularly preferably 0.5% or less.

The thickness of a magnetic layer is from ⅒ to ½ of the gap length of a recording head, preferably from ⅛ to ⅓.

When a magnetic layer is thinner than ⅒ of the gap length, reproduction output is insufficient, and when thicker than ½ of the gap length, phase difference is generated between the magnetization factor in deep layers and the magnetization factor in surface layers, asymmetry of wave form becomes great and an overwriting erasure rate is reduced.

The squareness ratio (SQ) measured in the in-plane direction of a magnetic layer is generally from 0.5 to 0.95, and preferably from 0.6 to 0.85. The squareness ratio (SQ) ⊥ measured in the perpendicular direction to the magnetic layer surface is generally 0.5 or less, preferably 0.4 or less, and more preferably 0.35 or less. The lower limit of squareness ratio (SQ)⊥ is 0 but is practically 0.1 or higher.

The magnetic recording medium in the second invention may have a magnetic layer directly provided on a support, or a nonmagnetic lower layer may be provided between a magnetic layer and a support.

In the present invention, the thickness of a magnetic layer is from 0.0 to 0.2 μm, and preferably from 0.05 to 0.15 μm.

When the thickness of a magnetic layer is too thin, reproduction output is insufficient, on the other hand, when the thickness of a magnetic layer is too thick, phase difference is generated between the magnetization factor in deep layers and the magnetization factor in surface layers, asymmetry of wave form becomes great and an overwriting erasure rate is reduced.

Since the thickness of a magnetic layer in the second invention is thinnish, multilayer constitution using a non-magnetic lower layer is preferably used.

The coercive force (Hc) of a magnetic layer is more preferably from 158 to 350 kA/m (2,000 to 4,430 Oe), and still more preferably from 170 to 280 kA/m (2150 to 3540 Oe). In the distribution of magnetization, it is preferred to define that factors subject to magnetic flux revolution by applied magnetic field of 80 kA/m or less be at most less than 1%, more preferably 0.7% or less, and particularly preferably 0.5% or less.

The squareness ratio (SQ) measured in the longitudinal direction of in-plane of a magnetic layer is generally from 0.5 to 0.95, and preferably from 0.6 to 0.85. The squareness ratio (SQ)⊥ measured in the thickness direction of in-plane (perpendicular direction) of a magnetic layer is from 0 to 0.5, preferably from 0.1 to 0.4, and more preferably from 0.1 to 0.35.

When the squareness ratio in the longitudinal direction is less than 0.5, residual magnetic flux density (Br) becomes too low, and when it exceeds 0.95, noises increase by aggregation due to orientation.

Further, when the squareness ratio in the thickness direction exceeds 0.5, the effect of lengthwise factors decreases and output reduces.

Ferromagnetic Powder

Ferromagnetic powders for use in a magnetic layer in the present invention are not particularly restricted but acicular ferromagnetic alloy powders containing Fe as a main component and hexagonal ferrite powders are preferably used, and most preferred ferromagnetic powders are hexagonal ferrite powders.

The average particle size of magnetic powders in the present invention is from 10 to 35 nm, and preferably from 20 to 30 nm. When the average particle size is too small, magnetization is labile due to thermal fluctuation, and when it is too great, S/N ratio decreases.

The tabular ratio of magnetic powders in the present invention is from 1 to 15, preferably from 1 to 7, and more preferably from 2 to 6. When the tabular ratio is small, the packing density in a magnetic layer becomes high, which is preferred, but sufficient orientation cannot be obtained. When the tabular ratio is too high, there arises a problem that noise increases due to stacking among particles.

The ferromagnetic alloy powders contain Co, Ni, Mn, Zn and Nd as alloy components and Fe as a main component. In particular, Fe—Co alloy is known to be a material capable of obtaining high coercive force (Hc).

Particle sizes are preferably defined as follows in the relationship with the gap length (gl) of a recording head. That is, an average long axis length is from $\frac{1}{10}$ to $\frac{1}{2}$ of gl, and preferably from $\frac{1}{8}$ to $\frac{1}{3}$. An average short axis length is from $\frac{1}{100}$ to $\frac{1}{5}$ of gl, and preferably from $\frac{1}{50}$ to $\frac{1}{8}$. When these average particle sizes are too small, magnetization is labile due to thermal fluctuation, and when they are too great, the S/N ratio decreases.

σs (i.e., saturation magnetization) of ferromagnetic alloy powders is generally from 80 to 140 A·m²/kg, preferably from 90 to 130 A·m²/kg, and Hc is generally from 120 to 360 kA/m, preferably from 158 to 350 kA/m.

The examples of hexagonal ferrite powders include substitution products of barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase. Hexagonal ferrite powders may contain, in addition to prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, hexagonal ferrite powders containing the following elements, e.g., Co—Zn, Co—Ti, Co—Ti—Zr, Co—Ti—Zn, Ni—Ti—Zn, Nb—Zn—Co, Sb—Zn—Co and Nb—Zn can be used. According to starting materials and producing methods, specific impurities may be contained.

Hexagonal ferrite powders in the present invention have an average tabular diameter of from $\frac{1}{10}$ to $\frac{1}{2}$ of gl, and preferably from $\frac{1}{8}$ to $\frac{1}{3}$, and an average tabular thickness of from $\frac{1}{100}$ to $\frac{1}{5}$ of gl, and preferably from $\frac{1}{50}$ to $\frac{1}{8}$. When these average particle sizes are too small, magnetization is labile due to thermal fluctuation, and when they are too great, the S/N ratio decreases.

Since an MR head is used in reproduction in the present invention for increasing track density, it is necessary to reduce noise, and the tabular diameter is preferably from 10 to 35 run, but when the tabular diameter is smaller than 10 nm, stable magnetization cannot be obtained due to thermal fluctuation. When the tabular diameter is substantially larger than 40 nm, noise increases, thus none of such tabular diameters are suitable for high density recording according to the present invention.

The average tabular thickness of the hexagonal ferrite powders is thinner than the thickness of the MR head element for use in reproduction, preferably 80% or less of the thickness of the MR head element, and more preferably 60% or less. The average tabular thickness is preferably the thinner, but practically 3 nm or higher.

The average tabular ratio (the arithmetic mean of tabular diameter/tabular thickness) of hexagonal ferrite powders is preferably from 1 to 15, more preferably from 1 to 7. When the average tabular ratio is small, the packing density in a magnetic layer becomes high, which is preferred, but sufficient orientation cannot be obtained. When the average tabular ratio is higher than 15, noise increases due to stacking among particles. The specific surface area ($S_{BET}$) measured by the BET method of the particle sizes within this range is generally from 10 to 100 m²/g. The specific surface area nearly coincides with the value obtained by arithmetic operation from tabular diameter and tabular thickness of a particle. The distribution of tabular diameter and tabular thickness of particles is in general preferably as narrow as possible. The distributions are not regular distributions in many cases, but a variation coefficient expressed by the standard deviation σ to the average diameter (σ/average diameter) by computation is generally from 0.1 to 2.0. For obtaining narrow particle size distribution, it is efficient to make a particle-forming reaction system homogeneous to the utmost, to subject particles formed to distribution-improving treatments as well. For example, a method of selectively dissolving ultrafine particles in an acid solution is exemplified as the method of obtaining narrow particle size distribution. The average volume of hexagonal ferrite powders is from 1,000 to 10,000 nm³, preferably from 1,500 to 8,000 nm⁻³, and more preferably from 2,000 to 8,000 nm³.

Coercive force (Hc) measured in magnetic powders of generally from about 40 to about 400 kA/m can be produced.

Higher Hc is advantageous for high density recording but it is restricted by the capacity of a recording head. Magnetic powders in the present invention have Ha of from about 120 to about 360 kA/m, and more preferably from 158 to 350 kA/m. When the saturation magnetization of a head is higher than 1.4 tesla, Hc is preferably 175 kA/m or more. Hc can be controlled by particle diameters, the kinds and amounts of elements contained, the substitution sites of elements, and the reaction conditions of particle formation.

Saturation magnetization ($\sigma$s) is generally from 40 to 80 A·m$^2$/kg. $\sigma$s has inclination of becoming smaller as particles become finer. For improving $\sigma$s, it is well known to use composite of magnetoplumbite ferrite with spinel ferrite, to select the kinds and amounts of elements to be contained, or W-type hexagonal ferrite powders can also be used. When magnetic powders are dispersed, the particle surfaces of the magnetic powders may be treated with substances compatible with the dispersion media and the polymers. Inorganic or organic compounds are used as the surface treating materials. Oxides or hydroxides of Si, Al and P, various kinds of silane coupling agents, and various kinds of titanium coupling agents are representative examples. The amount of these surface treating materials is from 0.1 to 10% based on the amount of the magnetic powder. The pH of magnetic powders is also important for dispersion. pH is generally from 4 to 12 or so, and the optimal value is dependent upon the dispersion medium and the polymer. Taking the chemical stability and the storage stability of the media into consideration, pH of from about 6 to about 11 is selected. The water content in magnetic powders also affects dispersion. The optimal value is dependent upon the dispersion medium and the polymer, and the water content of from 0.01 to 2.0% based on magnetic powders is selected in general. The producing methods of hexagonal ferrite powders include the following methods and any of there methods can be used in the present invention, i.e., a glass crystallization method comprising the steps of mixing metallic oxides which substitute barium oxide, iron oxide and iron with boron oxide as a glass-forming material so as to make a desired ferrite composition, melting and then quenching the mixture to obtain an amorphous product, subjecting the amorphous product obtained to reheating, washing and then pulverizing to obtain a barium ferrite crystal powder; a hydrothermal reaction method comprising the steps of neutralizing a solution of metallic salt having barium ferrite composition with an alkali, removing the byproducts produced, heating the liquid phase at 100° C. or more, washing, drying and then pulverizing to thereby obtain a barium ferrite crystal powder; and a coprecipitation method comprising the steps of neutralizing a solution of metallic salt having barium ferrite composition with an alkali, removing the byproducts produced and drying, treating the system at 1,100° C. or less, and then pulverizing to obtain a barium ferrite crystal powder.

Nonmagnetic Layer

The lower nonmagnetic layer in the case where a lower nonmagnetic layer as a lower layer is provided between a support and a magnetic layer is described in detail below. The constitution of a lower layer in the present invention is not particularly limited so long as it is substantially nonmagnetic but, in general, a lower layer comprises at least a resin, preferably a powder, e.g., an inorganic or organic powder dispersed in a resin is exemplified. The inorganic powder is generally preferably a nonmagnetic powder but a magnetic powder can also be contained so long as a lower layer is substantially nonmagnetic.

Nonmagnetic powders can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and alpha-iron oxide are more preferred. These nonmagnetic powders preferably have a particle size of from 0.005 to 2 $\mu$m. A plurality of nonmagnetic powders each having a different particle size may be combined, if necessary, or a single nonmagnetic powder having a broad particle size distribution maybe used so as to attain the same effect as such a combination. A particularly preferred particle size of nonmagnetic powders is from 0.01 to 0.2 $\mu$m. In particular, when nonmagnetic powders are granular metallic oxides, their average particle size is preferably 0.08 $\mu$m or less, and when nonmagnetic powders are acicular metallic oxides, their long axis length is preferably 0.3 $\mu$m or less, and more preferably 0. 2 $\mu$m or less. Nonmagnetic powders for use in the present invention have a tap density of from 0.05 to 2 g/ml, and preferably from 0.2 to 1.5 g/ml; a water content of generally from 0.1 to 5 mass % (i.e., weight %), preferably from 0.2 to 3 mass %, and more preferably from 0.3 to 1.5 mass %; and a pH value of generally from 2 to 11, and particularly preferably from 5.5 and 10; a specific surface area ($S_{BET}$) of generally from 1 to 100 m$^2$/g, preferably from 5 to 80 m$^2$/g, and more preferably from 10 to 70 m$^2$/g; a crystallite size of preferably from 0.004 to 1 $\mu$m, and more preferably from 0.04 to 0.1 $\mu$m; an oil absorption amount using DBP (dibutyl phthalate) of from 5 to 100 ml/100 g, preferably from 10 to 80 ml/100 g, and more preferably from 20 to 60 ml/100 g; and a specific gravity of generally from 1 to 12, preferably from 3 to 6. The figure of nonmagnetic powders may be any of a circular, spherical, polyhedral and tabular figures. Nonmagnetic powders preferably have a Mohs' hardness of from 4 to 10. The SA (stearic acid) adsorption amount of nonmagnetic powders is from 1 to 20 $\mu$mol/m$^2$, preferably from 2 to 15 $\mu$mol/m$^2$, and more preferably from 3 to 8 $\mu$mol/m$^2$. The pH value of nonmagnetic powders is preferably between 3 and 6. The surfaces of these nonmagnetic powders are preferably covered with $Al_2O_3$, $SiO_2$, $TiO_2$, $ZrO_2$, $SnO_2$, $Sb_2O_3$, $ZnO$ or $Y_2O_3$. $Al_2O_3$, $SiO_2$, $TiO_2$ and $ZrO_2$ are preferred in the point of dispersibility, and $Al_2O_3$, $SiO_2$ and $ZrO_2$ are more preferred. These surface-covering agents can be used in combination or may be used alone. Surface treatment may be performed by coprecipitation, alternatively, surface treatment of particles may be previously performed to be covered with alumina in the first place, then the alumina covered surface maybe covered with silica, or vice versa, according to purposes. A surface-covered layer may be porous, if necessary, but a homogeneous and dense surface is generally preferred.

The specific examples of nonmagnetic powders for use in a lower layer in the present invention include Nanotite (Manufactured by Showa Denko Co., Ltd.), HIT-100 and ZA-G1 (manufactured by Sumitomo Chemical Co., Ltd.), alpha-hematite DPN-250, DPN-250BX, DPN-245, DPN- 270BX, DPN-500BX, DBN-SA1 and DBN-SA3 (manufactured by Toda Kogyo Co., Ltd.), titanium oxide TTO-51B, TTO-55A, TTO-55B, TTO-55C, TTO-55S, TTO-55D, SN-100, alpha-hematite E270, E271, E300 and E303 (manufactured by Ishihara Sangyo Kaisha K. K.), titanium oxide STT-4D, STT-30D, STT-30, STT-65C, and alpha-hematite alpha-40 (manufactured by Titan Kogyo Co., Ltd.), MT-100S, MTT-100T, MT-150W, MT-500B, MT-600B, MT-100F and MT-500HD (manufactured by Tayca Co., Ltd.), FINEX-25, BF-1, BF-10, BF-20 and ST-M (manufactured by Sakai Chemical Industry Co., Ltd.) DEFIC-Y and DEFIC-R (manufactured by Dowa Mining Co., Ltd.), AS2BM and $TiO_2$ P25 (manufactured by Nippon Aerosil Co., Ltd.), and 100A, 500A, and calcined products of them (manufactured by Ube Industries, Ltd.). Particularly preferred nonmagnetic powders are titanium dioxide and alpha-iron oxide.

By the incorporation of carbon blacks into a lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into a lower layer. Furnace blacks for rubbers, thermal blacks for rubbers, carbon blacks for coloring and acetylene blacks can be used as carbon blacks. Carbon blacks for use in a lower layer should optimize the following characteristics by the desired effects and sometimes more effects can be obtained by the combined use.

Carbon blacks for use in a lower layer according to the present invention have a specific surface area ($S_{BET}$) of from 100 to 500 $m^2/g$, and preferably from 150 to 400 $m^2/g$, a DBP oil absorption amount of from 20 to 400 ml/100 g, and preferably from 30 to 400 ml/100 g, a particle size of from 5 to 80 nm, preferably from 10 to 50 nm, and more preferably from 10 to 40 nm, pH of from 2 to 10, a water content of from 0.1 to 10%, and a tap density of from 0.1 to 1 g/ml. The specific examples of carbon blacks for use in a lower layer according to the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface of carbon blacks may be graphitized before use. Carbon blacks may be dispersed in a binder in advance before being added to a coating solution. Carbon blacks can be used within the range not exceeding 50 mass % based on the above inorganic powders and not exceeding 40 mass % based on the total weight of the nonmagnetic layers. These carbon blacks can be used alone or in combination. Regarding carbon blacks for use in the present invention, the description, e.g., in *Carbon Black Binran* (*Handbook of Carbon Blacks*) (edited by Carbon Black Association) can be referred to.

Organic powders can be used in a lower layer according to the purpose. The examples of such organic powders include an acryl styrene resin powder, a benzoguanamine resin powder, a melamine resin powder, and a phthalocyanine pigment. Besides the above, a polyolefin resin powder, a polyester resin powder, a polyamide resin powder, a polyimide resin powder, and a polyethylene fluoride resin powder can also be used. The producing methods of these resin powders are disclosed in Japanese Patent Laid-Open Nos. 18564/1987 and 255827/1985.

Binder resins, lubricants, dispersants, additives, solvents, dispersing methods, and others which are used in a magnetic layer described below can be used in a lower layer. In particular, with respect to the amounts and kinds of binder resins, additives, the amounts and kinds of dispersants, well-known prior art techniques regarding a magnetic layer can be applied to a lower layer.

Binder

Conventionally well-known thermoplastic resins, thermosetting resins, reactive resins and mixtures of these resins are used as a binder in the present invention. Thermoplastic resins having a glass transition temperature of from –100 to 150° C., a number average molecular weight of from 1,000 to 200,000, preferably from 10,000 to 100,000, and a polymerization degree of about 50 to about 1,000 can be used in the present invention.

The examples of such compounds include polymers or copolymers containing as a constituting unit the following compounds, e.g., vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. The examples of thermosetting resins and reactive resins which can be used in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate. These resins are described in detail in *Plastic Handbook*, published by Asakura Shoten Co. It is also possible to use well-known electron beam-curable resins in each layer. The examples of these resins and producing methods are disclosed in detail in Japanese Patent Laid-Open No. 256219/1987. These resins can be used alone or in combination. The examples of preferred combinations include combinations of at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, and polycaprolactone polyurethane. Concerning every binder shown above, it is preferred that at least one polar group selected from the following groups is introduced by copolymerization or addition reaction for the purpose of obtaining further excellent dispersibility and durability, e.g., —COOM, —$SO_3M$, —$OSO_3M$, —P=O$(OM)_2$, —O—P=O$(OM)_2$ (wherein M represents a hydrogen atom, or an alkali metal salt group), —OH, —$NR^2$, —$N^+R_3$ (R represents a hydrocarbon group), an epoxy group, —SH and —CN. The content of these polar groups is from $10^{-1}$ to $10^{-8}$ mol/g, and preferably from $10^{-2}$ to $10^{-6}$ mol/g.

The specific examples of binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-100, MR-100, MR-555 and 400X-110A (manufactured by Nippon Zeon Co., Ltd.), Nippollan N2301, N2302 and N2304 (manufactured by Nippon Polyurethane Co., Ltd.), PandexT-5105, T-R3080, T-5201, BurnockD-400, D-210-80, Crisvon 6109 and 7209 (manufactured by Dainippon Ink & Chemicals Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichi Seika K. K.), MX5004 (manufactured by Mitsubishi Kasei Corp.), Sunprene SP-150 (manufactured by Sanyo Chemical Industries Co. Ltd.), and Salan F310 and F210 (manufactured by Asahi Chemical Industry Co., Ltd.).

The amount of a binder for use in a nonmagnetic layer and a magnetic layer in the present invention is from 5 to 50 mass % (i.e., weight %), and preferably from 10 to 30 mass %, based on the amount of the nonmagnetic powder or the ferromagnetic powder. When vinyl chloride resins are used as a binder, the amount of a binder is from 5 to 30 mass %, when polyurethane resins are used, the amount is from 2 to 20 mass %, and it is preferred that polyisocyanate is used in an amount of from 2 to 20 mass % in combination with these binders. However, for instance, when head corrosion is caused by a slight amount of chlorine due to dechlorination, it is also possible to use polyurethane alone or a combination of polyurethane and isocyanate alone. When polyurethane is used in the present invention, it is preferred that polyurethane has a glass transition temperature of from −50 to 150° C., and preferably from 0 to 100° C., breaking extension of from 100 to 2,000%, breaking stress of from 0.05 to 10 kg/mm$^2$ (0.49 to 98 MPa), and a yielding point of from 0.05 to 10 kg/mm$^2$ (0.49 to 98 MPa).

The magnetic recording medium in the present invention may comprise two or more layers. Accordingly, the amount of the binder, the amounts of the vinyl chloride resins, the polyurethane resins, the polyisocyanate or other resins contained in the binder, the molecular weight of each resin constituting the magnetic layer, the amount of the polar groups, or the above-described physical properties of resins can of course be varied in the nonmagnetic layer and the magnetic layer, according to necessity. These factors should be rather optimized in each layer. Well-known techniques with respect to multilayer magnetic layers can be used in the present invention. For example, when the amount of a binder is varied in each layer, it is effective to increase the amount of a binder contained in a magnetic layer to decrease scratches on the surface of the magnetic layer. For improving head touch against a head, it is effective to increase the amount of a binder in a nonmagnetic layer to impart flexibility.

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity in each layer.

Carbon Black, Abrasive

The examples of carbon blacks for use in a magnetic layer in the present invention include furnace blacks for rubbers, thermal blacks for rubbers, carbon blacks for coloring and acetylene blacks. Carbon blacks for use in a magnetic layer in the present invention preferably have a specific surface area ($S_{BET}$) of from 5 to 500 m$^2$/g, a DBP oil absorption amount of from 10 to 400/ml 100 g, a particle size of from 5 to 300 nm, preferably from 10 to 250 nm, and more preferably from 20 to 200 nm, pH of from 2 to 10, a water content of from 0.1 to 10%, and a tap density of from 0.1 to 1 g/ml. The specific examples of carbon blacks for use in a magnetic layer in the present invention include BLACK-PEARLS 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Kasei Corp.), CONDUCTEX SC, RAVEN 150, 50, 40 and 15, and RAVEN-MT-P (manufactured by Columbia Carbon Co., Ltd.); and Ketjen Black EC (manufactured by Akzo Co., Ltd.). Carbon blacks for use in the present invention may be previously surface-treated with a dispersant, may be grafted with a resin, or a part of the surface may be graphitized before use. Carbon blacks may be previously dispersed in a binder before being added to a magnetic coating solution. These carbon blacks may be used alone or in combination. Carbon blacks are preferably used in an amount of from 0.1 to 30 mass % based on the amount of the magnetic powder. Carbon blacks can serve various functions such as preventing the static charge of a magnetic layer, reducing the friction coefficient, imparting a light-shielding property and improving film strength. Such functions vary depending upon the kind of carbon blacks to be used. Accordingly, it is of course possible in the present invention to select and determine the kinds, amounts and combinations of the carbon blacks to be added to an upper magnetic layer and a lower nonmagnetic layer, on the basis of the above-described various properties such as the particle size, the oil absorption amount, the electroconductivity and the pH value, or these should be rather optimized in each layer. Regarding carbon blacks for use in a magnetic layer in the present invention, e.g., compiled by Carbon Black Association, *Carbon Black Binran* (*Handbook of Carbon Blacks*) can be referred to.

As abrasives which are used in the present invention, well-known materials essentially having a Mohs' hardness of 6 or more maybe used alone or in combination, e.g., alpha-alumina having an alpha-conversion rate of 90% or more, beta-alumina, silicon carbide, chromium oxide, cerium oxide, alpha-iron oxide, corundum, artificial diamond, silicon nitride, silicon carbide, titanium carbide, titanium oxide, silicon dioxide and boron nitride. Composites composed of these abrasives (abrasives obtained by surface-treating with other abrasives) may also be used. Compounds or elements other than the main component are often contained in these abrasives, but the intended effect can be attained so long as the content of the main component is 90% or more. Abrasives preferably have a particle size of from 0.01 to 2 μm, more preferably from 0.05 to 1.0 μm, and particularly preferably from 0.05 to 0.5 μm. In particular, for improving electromagnetic characteristics, abrasives having narrow particle size distribution are preferred. For improving durability, a plurality of abrasives each having a different particle size maybe combined according to necessity, or a single abrasive having a broad particle size distribution may be used so as to attain the same effect as such a combination. Abrasives for use in the present invention preferably have a tap density of from 0.3 to 2 g/ml, a water content of from 0.1 to 5%,1 a pH value of from 2 to 11, and a specific surface area ($S_{BET}$) of from 1 to 30 m$^2$/g. The figure of the abrasives for use in the present invention may be any of acicular, spherical and die-like figures. Abrasives having a figure partly with edges are preferred in view of capable of obtaining a high abrasive property. The specific examples of abrasives for use in the present invention include AKP-12, AKP-15, KKP-20, AKP-30, AKP-50, HIT-20, HIT-30, HIT-55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenmazai K. K.), UB20 (manufactured by Uemura Kogyo K. K.), G-5, Chromex U2 and Chromex U1 (manufactured by Nippon Chemical Industrial Co., Ltd.), TF100 and TF140 (manufactured by Toda Kogyo Co., Ltd.), beta-Random Ultrafine (manufactured by Ividen Co., Ltd.), and B-3 (manufactured by Show & Mining Co., Ltd.). These abrasives may be added to a nonmagnetic layer, if necessary. By adding abrasives into a nonmagnetic layer, it is possible to control the surface configuration or prevent abrasives from protruding. The particle sizes and amounts of abrasives to be added to a magnetic layer and a nonmagnetic layer should be selected at optimal values.

Additives

As additives which can be used in a magnetic layer and a nonmagnetic layer in the present invention, additives having a lubricating effect, an antistatic effect, a dispersing effect and a plasticizing effect may be used. The examples of additives which can be used in the present invention include molybdenum disulfide, tungsten disulfide, graphite, boron nitride, graphite fluoride, silicone oils, polar group-containing silicons, fatty acid-modified silicons, fluorine-containing silicons, fluorine-containing alcohols, fluorine-containing esters, polyolefins, polyglycols, alkyl phosphates and alkali metallic salts thereof, alkyl sulfates and alkali metallic salts thereof, polyphenyl ethers, phenylphosphonic acids, alpha-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metallic salts thereof, monobasic fatty acids having from 10 to 24 carbon atoms (which may contain an unsaturated bond or may be branched) and metallic salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms, mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

The specific examples of fatty acids as additives include capric acid, caprylic acid, lauric acid, myristic acid, palmitic acid, stearic acid, behenic acid, oleic acid, elaidic acid, linolic acid, linolenic acid and isostearic acid. The specific examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl, and the examples of alcohols include oleyl alcohol, stearyl alcohol and lauryl alcohol. In addition to the above compounds, the examples of other additives which can be used include nonionic surfactants, e.g., alkylene oxide, glycerol, glycidol or alkylphenol-ethylene oxide adducts; cationic surfactants, e.g., cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, a sulfate group or a phosphate group; and amphoteric surfactants, e.g., amino acids, aminosulfonic acids, sulfates or phosphates of amino alcohols, and alkylbetains. The details of these surfactants are described in *Kaimen Kasseizai Binran* (*Handbook of Surfactants*), Sangyo Tosho Publishing Co., Ltd. These lubricants and antistatic agents need not be 100% pure and they may contain impurities such as: isomers, non-reacted products, byproducts, decomposed products and oxides, in addition to the main components. However, the content of such impurities is preferably 30% or less, and more preferably 10% or less.

Lubricants and surfactants for use in the present invention respectively have different physical functions. The kinds, amounts and proportions of combination generating a synergistic effect of these lubricants should be determined optimally in accordance with the purpose. For example, a nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of a lubricant in an intermediate layer is made larger so as to improve the lubricating effect of the surface thereof. Examples are by no means limited thereto. In general, the total amount of lubricants is from 0.1 to 50%, preferably from 2 to 25%, based on the magnetic powder or nonmagnetic powder.

All or a part of the additives to be used in the present invention may be added to a magnetic coating solution or a nonmagnetic coating solution in any step of preparation. For example, additives may be blended with a magnetic powder before a kneading step, maybe added during a step of kneading a magnetic powder, a binder and a solvent, may be added during a dispersing step, may be added after a dispersing step, or may be added just before coating. According to purpose, there is a case of capable of attaining the object by coating all or a part of additives simultaneously with or successively after coating of a magnetic layer. Lubricants may be coated on the surface of a magnetic layer after calendering treatment or after completion of slitting, according to purpose. Well-known organic solvents can be used in the present invention, e.g., the organic solvents disclosed in Japanese Patent Laid-Open No. 68453/1994 can be used.

Layer Constitution

The thickness of a support in the magnetic recording medium in the present invention is from 2 to 100 $\mu$m, and preferably from 2 to 80 μm. The thickness of a support for a computer tape is from 3.0 to 6.5 μm, preferably from 3.0 to 6.0 μm, and more preferably from 4.0 to 5.5 μm.

A subbing layer (i.e., An undercoating layer) may be provided between a support and a nonmagnetic layer or a magnetic layer for the purpose of improving adhesion. The thickness of the subbing layer is from 0.01 to 0.5 μm, and preferably from 0.02 to 0.5 μm.

In the present invention, a lower nonmagnetic layer of a magnetic recording medium is from 0.2 to 5.0 μm, preferably from 0.3 to 3.0 μm, and more preferably from 1.0 to 2.5 μm. The lower layer exhibits the effect of the present invention so long as it is substantially nonmagnetic even if a small amount of a magnetic powder is contained as impurity or intentionally, and such can of course be regarded as substantially the same constitution with the constitution of the present invention. "Substantially nonmagnetic" means that the residual magnetic flux density of the lower layer is 0.01 T or less or the coercive force of a lower layer is 7.96 kA/m or less (100 Oe or less), preferably the residual magnetic flux density and the coercive force are zero.

Backing Layer

In general, a magnetic tape for computer data recording is decidedly required to have an excellent repeating-running property as compared with a video tape and an audio tape. For maintaining such high running durability, it is preferred that a backing layer containing a carbon black and an inorganic powder is provided on the side of a support opposite to the side on which a magnetic layer is provided.

It is preferred to use two kinds of carbon blacks each having a different average particle size in combination. In this case, it is preferred to use a fine particle carbon black having an average particle size of from 10 to 20 nm and a coarse particle carbon black having an average particle size of from 230 to 300 nm in combination. In general, by the addition of a fine particle carbon black as above, the surface electrical resistance of a backing layer and also light transmittance can be set at low values. Since there are many kinds of magnetic recording apparatus making use of light transmittance of a tape and making it as signals of operation, the addition of fine particle carbon blacks is particularly effective in such a case. In addition, a fine particle carbon black is in general excellent in retention of a liquid lubricant and contributes to the reduction of a friction coefficient when a lubricant is used in combination. On the other hand, a coarse particle carbon black having an average particle size of from 230 to 300 nm has a function as a solid lubricant and forms minute protrusions on the surface of a backing layer, to thereby contribute to reduce a contact area and a friction coefficient. However, a coarse carbon black has a drawback such that, when it is used alone, particles are liable to drop out from a backing layer due to the tape sliding during severe running, which leads to the increase of the error rate.

The specific examples of commercially available fine carbon blacks are shown below each with the average particle size in parentheses, e.g., RAVEN 2000B (18 nm) and RAVEN 1500B (17 nm) (manufactured by Columbia Carbon Co., Ltd.), BP800 (17 nm) (manufactured by Cabot Co., Ltd.), PRINTEX90 (14 nm), PRINTEX95 (15 nm), PRINTEX85 (16 nm), and PRINTEX75 (17 nm) (manufactured by Degussa Co., Ltd.), and #3950 (16 nm) (manufactured by Mitsubishi Kasei Corp.).

The specific examples of commercially available coarse particle carbon blacks include THERMAL BLACK (270 nm) (manufactured by Cancarb Co., Ltd.) and RAVEN MTP (275 nm) (manufactured by Columbia Carbon Co., Ltd.).

When two kinds of carbon blacks each having a different average particle size are used in combination in a backing layer, the proportion of the contents (by weight) of a fine carbon black having a particle size of from 10 to 20 nm and a coarse carbon black having a particle size of from 230 to 300 m is preferably the former/the latter of from 98/2 to 75/2, and more preferably from 95/5 to 85/15.

The content of a carbon black in a backing layer (the total amount when two kinds are used) is generally from 30 to 80 mass parts (i.e., weight parts), preferably from 45 to 65 mass parts (i.e., weight parts), based on 100 mass parts of the binder.

It is preferred to use two kinds of inorganic powders each having different hardness. Specifically, it is preferred to use a soft inorganic powder having a Mohs' hardness of from 3 to 4.5 and a hard inorganic powder having a Mohs' hardness of from 5 to 9 in combination. By the addition of a soft inorganic powder having a Mohs' hardness of from 3 to 4.5, a friction coefficient can be stabilized against repeating-running. Moreover, a sliding guide pole is not scraped off with the hardness within this range. The average particle size of such a soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more.

The content of soft inorganic powders in a backing layer is preferably from 10 to 140 mass parts, and more preferably from 3+5 to 100 mass parts, based on 100 mass parts of the carbon black.

By adding a hard inorganic powder having a Mohs' hardness of from 5 to 9 to a backing layer, the strength of the backing layer is increased and running durability is improved. When such hard inorganic powders are used together with carbon blacks and the above-described soft inorganic powders, deterioration due to repeating sliding is reduced and a strong backing layer can be obtained. Appropriate abrasive capability is imparted to a backing layer by the addition of such the inorganic powders and the adhesion of scratched powders to a tape guide pole is reduced. In particular, when a hard inorganic powder is used in combination with a soft inorganic powder, sliding characteristics against a guide pole having a rough surface is improved and a friction coefficient of a backing layer can also be stabilized.

The average particle size of hard inorganic powders is preferably from 80 to 250 nm, and more preferably from 100 to 210 nm.

The examples of hard inorganic powders having a Mohs' hardness of from 5 to 9 include, e.g., alpha-iron oxide, alpha-alumina, and chromium oxide ($Cr_2O_3$). These hard inorganic powders may be used alone or in combination. Of the above powders, alpha-iron oxide and alpha-alumina are preferred. The content of hard inorganic powders in a backing layer is generally from 3 to 30 mass parts (i.e., weight parts), and preferably from 3 to 20 mass parts, based on 100 mass parts of the carbon black.

When soft inorganic powders and hard inorganic powders are used in combination in a backing layer, it is preferred to use soft inorganic powders and hard inorganic powders selectively such that the difference of hardness between soft and hard inorganic powders is 2 or more, more preferably 2.5 or more, and particularly preferably 3 or more.

It is preferred that the above-described two kinds of inorganic powders each having a specific average particle size and different Mohs' hardness and the above-described two kinds of carbon blacks each having a different average particle size are contained in a backing layer.

Lubricants may be contained in a backing layer. Lubricants which can be used in a backing layer can be arbitrarily selected from among the lubricants which can be used in a nonmagnetic layer or a magnetic layer as described above. The content of lubricants added to a backing layer is generally from 1 to 5 mass parts based on 100 mass parts of the binder.

Support

Supports for use in the present invention are not particularly limited but they are preferably substantially nonmagnetic and flexible supports.

The examples of flexible supports which are used in the present invention include well-known films such as polyesters (e.g., polyethylene terephthalate and polyethylene naphthalate), polyolefins, cellulose triacetate, polycarbonate, polyamide (including aliphatic polyamide and aromatic polyamide such as aramid), polyimide, polyamideimide, polysulfone, and polybenzoxazole. Highly strong supports such as polyethylene naphthalate and polyamide are preferably used. If necessary, a lamination type support as disclosed in Japanese Patent (Application) Laid-Open No. 224127/1991 can be used to vary the surface roughnesses of a magnetic layer surface and a base surface. Supports may be subjected to surface treatments in advance, such as corona discharge treatment, plasma treatment, easy adhesion treatment, heat treatment, and dust removing treatment. It is also possible to use an aluminum or glass substrate as a support in the present invention.

For attaining the object of the present invention, it is preferred to use a support having a central plane average surface roughness (Ra) (according to JIS B0601) of 8.0 nm or less, preferably 4.0 nm or less, and more preferably 2.0 nm or less, measured by a surface roughness meter TOPO-3D (a product manufactured by WYKO, Arizona, U.S.A.). It is preferred that a support not only has a mall central plane average surface roughness but also is free from coarse protrusions having a height of 0.5 $\mu$m or more. Surface roughness configuration is freely controlled by the size and the amount of fillers added to a support according to necessity. The examples of such fillers include acryl-based organic fine powders, as well as oxides or carbonates of Ca, Si and Ti. A support for use in the present invention preferably has a maximum height (Rmax) of 1 $\mu$m or less, a ten point average roughness (Rz) of 0.5 $\mu$m or less, a central plane peak height (Rp) of 0.5 $\mu$m or less, a central plane valley depth (Rv) of 0.5 $\mu$m or less, a central plane are a factor (Sr) of from 10 to 90%, and an average wavelength ($\lambda$a) of from 5 to 300 $\mu$m. For obtaining desired electromagnetic characteristics and durability, surface protrusion distribution of a support can be controlled arbitrarily by fillers, e.g., the number of protrusions having sizes of from 0.01 to 1 $\mu$m can be controlled each within the range of from 0 to 2,000 per 0.1 mm$^2$. A support for use in the present invention has an F-5 value of preferably from 5 to 50 kg/mm$^2$ (49 to 490 MPa), a thermal shrinkage factor of a support at 100° C. for 30 minutes of preferably 3% or less, and more preferably 1.5% or less, and a thermal shrinkage factor at 80° C. for 30 minutes of preferably 1% or less, and more preferably 0.5% or less. A support has a breaking strength of from 5 to 100 kg/mm$^2$ (=about 49 to 980 MPa), an elastic modulus of from 100 to 2,000 kg/=m$^2$ (=about 0.98 to 19.6 GPa), a temperature expansion coefficient of from $10^{-4}$ to $10^{-8}$/° C., and preferably from $10^{-5}$ to $10^{-6}$/° C., and a humidity expansion coefficient of $10^{-4}$/RH % or less, and preferably $10^{-5}$/RH % or less. These thermal characteristics, dimensional characteristics and mechanical strength characteristics are preferably almost equal in every direction of in-plane of a support with difference of 10% or less.

Producing Method

Processes of preparing magnetic layer and nonmagnetic layer coating solutions for use in the magnetic recording medium in the present invention comprise at least a kneading step, a dispersing step and, optionally, blending steps to be carried out before and/or after the kneading and dispersing steps. Each of these steps may be composed of two or more separate stages. Materials such as a ferromagnetic powder, a nonmagnetic powder, a binder, a carbon black, an abrasive, an antistatic agent, a lubricant and a solvent for use in the present invention may be added in any step at any time, and each material may be added in two or more separate steps. For example, polyurethane can be added in parts in a kneading step, a dispersing step, or a blending step for adjusting viscosity after dispersion. For achieving the object of the present invention, the above steps can be performed partly with conventionally well-known producing techniques. It is preferred to use powerful kneading machines such as an open kneader, a continuous kneader, a pressure kneader or an extruder in a kneading step. When a kneader in used, a magnetic powder or a nonmagnetic powder and all or a part of a binder (preferably 30% or more of the total binder) and in the range of from 15 to 500 parts per 100 parts of the magnetic powder are kneading-treated. Details of kneading treatment are disclosed in Japanese Patent Laid-Open Nos. 106338/1989 and 79274/1989. When a magnetic layer solution and a nonmagnetic layer solution are dispersed, glass beads can be used but dispersing media having a high specific gravity are preferably used, e.g., zirconia beads, titania beads and steel beads are suitable for this purpose. Optimal particle sizes and packing densities of these dispersing media should be selected. Well-known dispersing apparatuses can be used in the present invention.

The following methods are preferably used for coating a magnetic recording medium having a multilayer constitution in the present invention. As the first method, a lower layer is coated by any of gravure coating, roll coating, blade coating and extrusion coating apparatus, which are ordinarily used in the coating of a magnetic coating solution, and then an upper layer is coated while the lower layer is still wet by means of a support pressure type extrusion coating apparatus as disclosed in Japanese Patent Publication No. 46186/1989, Japanese Patent Laid-Open Nos. 238179/1985 and 265672/1990. As the second method, an upper layer and a lower layer are coated almost simultaneously using a coating head equipped with two slits for feeding coating solution as disclosed in Japanese Patent Laid-open Nos. 88080/1988, 17971/1990 and 265672/1990. As the third method, an upper layer and a lower layer are coated almost simultaneously using an extrusion coating apparatus equipped with a backup roll as disclosed in Japanese Patent Laid-Open No. 174965/1990. For preventing the electromagnetic characteristics of a magnetic recording medium from deteriorating due to aggregation of-magnetic particles, it is preferred to give shear to the coating solution in a coating head by the methods as disclosed in Japanese Patent Laid-Open Nos. 95174/1987 and 236968/1989. With respect to the viscosity of a coating solution, the range of the numeric values disclosed in Japanese Patent Laid-Open No. 8471/1991 is necessary to be satisfied. For realizing the constitution of the present invention, a successive multilayer coating method of coating a lower layer, drying the lower layer and successively coating a magnetic layer on the lower layer can of course be used without impairing the effect of the present invention. However, for reducing coating defects and improving quality, e.g., dropout, it is preferred to use the above simultaneous multilayer coating method.

In the case of a magnetic disc, isotropic orientation can be sufficiently achieved in some cases without performing orientation using an orientation apparatus, but it is preferred to use well-known random orientation apparatus, e.g., disposing cobalt magnets diagonally and alternately or applying an alternating current magnetic field using a solenoid. Isotropic orientation in ferromagnetic metal powders is in general preferably in-plane two dimensional random orientation, but it may be three dimensional random orientation having perpendicular factors. Hexagonal ferrites in general have an inclination for three dimensional random orientation of in-plane and In the perpendicular direction but it can be made in-plane two dimensional random orientation. It is also possible to impart to hexagonal ferrites isotropic magnetic characteristics in the circumferential direction by perpendicular orientation using well-known methods, e.g., using heteropolar-facing magnets. Perpendicular orientation is preferred particularly when a disc is used for high density recording. Circumferential orientation can be performed using spin coating.

In the case of a magnetic tape, orientation is performed in the longitudinal direction using a cobalt magnet and a solenoid. In orientation, it in preferred that the drying position of the coated film can be controlled by controlling the temperature and the amount of drying air and coating velocity. Coating velocity is preferably from 20 to 1,000 m/min. and the temperature of drying air is preferably 60° C. or more. Appropriate preliminary drying can also be performed before entering a magnet zone.

A magnetic recording medium is generally subjected to calendering treatment after coating and drying. Heat resisting plastic rollers such as epoxy, polyimide, polyamide and polyimideamide rollers, or metal rollers are used for calendering treatment. Metal rollers are preferably used for the treatment particularly when magnetic layers are coated on both surface sides of a support. Temperature for treatment is preferably 50° C. or more, and more preferably 100° C. or more. Linear pressure is preferably 200 kg/cm (196 kN/m) or more, and more preferably 300 kg/cm (294 kN/m) or more.

Physical Properties

The saturation magnetic flux density of a magnetic layer of the magnetic recording medium according to the present invention is from 0.2 to 0.5 T when a ferromagnetic metal fine powder is used, and from 0.1 to 0.3 T when a hexagonal ferrite powder is used. The coercive force Hc and Hr is from 1,500 to 5,000 Oe (120 to 400 kA/m), preferably from 2,000 to 4,330 Oe (158 to 350 kA/m), more preferably from 1,700 to 3,000 Oe (136 to 240 kA/m), and most preferably from 2150 to 3540 Oe (170 to 280 kA/m). Coercive force distribution is preferably narrow, and SFD and SFDr are preferably 0.6 or less.

In the case of a magnetic tape, a squareness ratio is 0.7 or more, and preferably 0.8 or more.

The magnetic recording medium in the present invention has a friction coefficient against a head at temperature of from −10° C. to 40° C. and humidity of from 0% to 95% of 0.5 or less, preferably 0.3 or less, a surface intrinsic resistivity of magnetic surface of preferably from $10^4$ to $10^{12}$ Ω/sq, a charge potential (i.e., a chargeability) of preferably from −500 V to +500 V, an elastic modulus at 0.5% elongation of a magnetic layer of preferably from 100 to 2,000 kg/mm$^2$ (0.98 to 19.6 GPa) in every direction of in-plane, a breaking strength of preferably from 10 to 70 kg/mm$^2$ (98 to 686 MPa), an elastic modulus of preferably from 100 to 1,500 kg/mm$^2$ (0.98 to 14.7 GPa) in every direction of in-plane, a residual elongation of preferably 0.5% or less, and a thermal shrinkage factor at every temperature of 100° C. or less of preferably 1% or less, more preferably 0.5% or less, and most preferably 0.1% or less. The glass transition temperature of a magnetic layer (the maximum point of loss elastic modulus by dynamic viscoelasticity measurement at 110 Hz) is preferably from 50° C., to 120° C., and that of a lower nonmagnetic layer is preferably from 0° C. to 100° C. The loss elastic modulus is preferably within the range of from $1 \times 10^9$ to $8 \times 10^{10}$ μN/cm$^2$, and loss tangent is preferably 0.2 or less. If loss tangent is too great, adhesion failure is liable to occur. These thermal and mechanical characteristics are preferably almost equal in every direction of in-plane of the medium within difference of 10% or less. The residual amount of the solvent contained in a magnetic layer is preferably 100 mg/m2 or less, more preferably 10 mg/m$^2$ or less. The void ratio of a coating layer is preferably 30% by volume or less, and more preferably 20% by volume or less, with both of a nonmagnetic layer and a magnetic layer. The void ratio is preferably smaller for obtaining high output, but it is preferred in some cases that a specific value should be secured depending upon purposes. For example, in a disc-like medium which is repeatedly used, large void ratio contributes to good running durability in many cases.

A magnetic layer preferably has a central plane average surface roughness (Ra) of 4.0 nm or less, preferably 3.8 nm or less, more preferably 3.5 nm or less, on measuring an area of about 250 μm×250 μm using TOPO-3D (a product manufactured by WYKO, Arizona, U.S.A.). A magnetic layer for use in the present invention preferably has a maximum height (Rmax) of 0.5 μm or less, a ten point average roughness (Rz) of 0.3 μm or less, a central plane peak height (Rp) of 0.3 μm or less, a central plane valley depth (Rv) of 0.3 μm or less, a central plane area factor (Sr) of from 20% to 80%, and an average wavelength (λa) of from 5 to 300 μm. It is preferred to optimize electromagnetic characteristics and friction coefficient by setting surface protrusions of a magnetic layer within the above described range. These characteristics can be easily controlled by controlling the surface property by fillers in the support, controlling the particle size and the amount of the magnetic powder added to a magnetic layer, or varying the surface figure of the rollers used in the calendering treatment. Curling is preferably within the range of ±3 mm.

When the magnetic recording medium according to the present invention comprises a nonmagnetic layer and a magnetic layer, it can be easily presumed that these physical properties can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer, to thereby improve the head touching of the magnetic recording medium.

EXAMPLE

The present invention will be described in detail below with reference to specific examples, but the present invention should not be construed as being limited thereto. In the examples, "part" means "mass part (i.e., weight part)", unless otherwise indicated.

Example I-1

Preparation of Coating Solution:

Magnetic coating solution

| | |
|---|---|
| Barium ferrite magnetic powder | 100 parts |
| Average tabular diameter: 30 nm | |
| Average tabular thickness: 10 nm | |
| Average particle volume: 5,800 nm$^3$ | |

-continued

Preparation of Coating Solution:

| | |
|---|---|
| Proportion of particles having a tabular diameter of 10 nm or less: 6% | |
| Hc: 183 kA/m | |
| σs: 50 A · m²/kg | |
| Specific surface area (S$_{HET}$): 65 m²/g | |
| Vinyl chloride copolymer MR110 (manufactured by Nippon Zeon Co., Ltd.) | 10 parts |
| Polyurethane resin Containing an SO$_3$Na group Tg: 82° C. | 5 parts |
| alpha-Alumina HIT55 (manufactured by Sumitomo Chemical Co., Ltd.) Average particle size: 0.2 μm | 5 parts |
| Carbon black #55 (manufactured by Asahi Carbon Co., Ltd.) Average particle size: 0.075 μm Specific surface area (S$_{HET}$): 35 m²/g DBP oil absorption amount: 81 ml/100 g pH: 7.7 Volatile content: 1.0% | 1 part |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Nonmagnetic coating solution | |
| Nonmagnetic powder, acicular hematite Average long axis length: 0.15 μm Specific surface area (S$_{HET}$): 50 m²/g pH: 8.5 Surface-covering compound: Al$_2$O$_3$ | 80 parts |
| Carbon black Average particle size: 20 nm | 20 parts |
| Vinyl chloride copolymer MR110 (manufactured by Nippon Zeon Co., Ltd.) | 7 parts |
| Polyurethane resin Containing an SO$_3$Na group Tg: 55° C. | 10 parts |
| Butyl stearate | 1 part |
| Stearic acid | 3 parts |
| Methyl ethyl ketone/cyclohexanone (8/2 mixed solvent) | 250 parts |

With each of the above compositions of the magnetic layer coating solution and the nonmagnetic layer coating solution, each components were blended in a kneader, and then dispersed in a sand mill for 4 hours. Polyisocyanate was added to each resulting dispersion solution, in an amount of 2.5 parts to the nonmagnetic layer coating solution, and 3 parts to the magnetic layer coating solution. Further, 40 parts of cyclohexanone was added to each solution. Each solution was filtered through a filter having an average pore diameter of 1 μm to obtain coating solutions for forming a nonmagnetic layer and a magnetic layer. The nonmagnetic layer-forming coating solution and magnetic layer-forming coating solution obtained were simultaneously multilayer-coated on an aramid support having a thickness of 4.4 μm, a central plane average surface roughness of 2 nm. The nonmagnetic layer-forming coating solution was coated in a dry thickness of 1.7 μm, immediately thereafter the magnetic layer-forming coating solution was coated on the lower layer in a dry thickness of 0.1 μm. Both layers were subjected to orientation with a cobalt magnet having a magnetic force of 0.6 T and a solenoid having a magnetic force of 0.6 T while both layers were still wet. After drying, the coated layers were subjected to calendering treatment by a calender of 7 stages comprising metal rolls alone at 85° C. and a velocity of 200 m/min. Thereafter, a backing layer (100 parts of a carbon black having an average particle size of 17 nm, 80 parts of calcium carbonate having an average particle size of 40 nm, and 5 parts of alpha-alumina having an average particle size of 200 nm were dispersed in a nitrocellulose resin, a polyurethane resin and polyisocyanate) having a thickness of 0.5 μm was coated. The obtained web was slit to a width of ½ inches. The magnetic layer surface of the thus-produced tape was cleaned with a tape cleaning apparatus having a delivery and a winding-up movement of a slit product to which a nonwoven fabric and a razor blade were attached no as to be pressed against the magnetic surface of the tape, thus a tape sample was obtained.

Performances of the tape were measured and evaluated by the following methods.

(1) The Largest Particle Size and the Smallest Particle Size of the Ferromagnetic Powder Photographs of 500 particles were taken with a transmission electron microscope (TEM) of 500,000 magnifications and particle sizes were measured by an image analyzer.

(2) The Magnetic Characteristics of the Ferromagnetic Powder

Hc and σs were measured with a vibrating sample magnetometer (a product of Toei Kogyo Co., Ltd.) by am 796 kA/m (10 kOe).

(3) The Thickness of the Magnetic Layer

A sliced piece of the sample was prepared and the average thickness of the magnetic layer was measured by TEM.

(4) Electromagnetic Characteristics

Measurement was performed by pressing a magnetic head against the magnetic tape wound around a rotating drum.

The diameter of the rotating drum was 60 mm, and the relative velocity of head/tape was 10 m/sec.

In recording, an MIG head of saturation magnetization of 1.4 T (gl: 0.2 μm, track width: 18 μm) was used, and recording current was set at optimal recording current of each tape. An anisotropic type MR head (A-MR) having an elemental thickness of 25 nm was used as a reproduction head.

S/N ratio: A signal of recording wavelength of 0.2 μm was recorded and reproduced signal was analyzed by frequency using a spectrum analyzer manufactured by Shibasoku K.K. The ratio of the output of carrier signal (wavelength 0.2 μm) to the integral noise of the full spectral band was taken as the S/N ratio.

Overwriting erasure rate: A signal of recording wavelength of 0.8 μm was recorded, and then a signal of recording wavelength of 0.2 μm was overwritten, and the residual rate of the signal of recording wavelength of 0.8 μm was obtained by the following equation and expressed by dB. The residual rate=20 log (output before overwriting/output after overwriting).

Recording density at half the peak voltage of the isolated pulse D$_{50}$: Recording is done by shortening recording wavelength successively from recording wavelength of 10 μm, and the track recording density of the time when the reproduction output becomes half the reproduction output of the time of recording wavelength of 10 μm is the recording density at half the peak voltage of the isolated pulse D$_{50}$.

Examples I-2 to I-7 and Comparative Examples I-1 to I-3

Each tape sample was prepared in the same manner as in Example I-1 except that gl, the ferromagnetic powder and the magnetic layer thickness were changed to those described in Table I-1. BaFe shown in the kind of ferromagnetic powder in the table means barium ferrite and Fe—Co means acicular ferromagnetic alloy powder.

TABLE I-1

|  |  | Ex. I-1 | Ex. I-2 | Ex. I-3 | Ex. I-4 | Ex. I-5 | Ex. I-6 | Ex. I-7 | Comp. Ex. I-1 | Comp. Ex. I-2 | Comp. Ex. I-3 |
|---|---|---|---|---|---|---|---|---|---|---|---|
| gl ($\mu$m) |  | 0.2 | 0.2 | 0.15 | 0.15 | 0.25 | 0.25 | 0.25 | 0.35 | 0.15 | 0.15 |
| Ferromagnetic Powder | Kind | BaFe | BaFe | BaFe | BaFe | Fe—Co | Fe—Co | Fe—Co | Fe—Co | Fe—Co | BaFe |
|  | Maximum particle size (nm) | 30 | 20 | 25 | 25 | 60 | 45 | 90 | 110 | 90 | 45 |
|  | Minimum particle size (nm) | 10 | 8 | 8 | 8 | 12 | 10 | 12.5 | 13.5 | 12.5 | 15 |
|  | σs (A · m$^2$/kg) | 50 | 47 | 49 | 49 | 115 | 50 | 135 | 145 | 145 | 51 |
|  | Hc (kA/m) | 183 | 192 | 180 | 180 | 185 | 180 | 190 | 185 | 185 | 182 |
| Magnetic layer thickness ($\mu$m) |  | 0.09 | 0.06 | 0.06 | 0.03 | 0.1 | 0.06 | 0.12 | 0.18 | 0.1 | 0.09 |
| S/N (dB) |  | 26 | 28 | 31 | 24.5 | 23 | 27.5 | 22 | 16.5 | 17 | 18.5 |
| Overwriting erasure rate (dB) |  | 27.5 | 32 | 33 | 35 | 26 | 31 | 25 | 15.5 | 21 | 23 |
| D$_{50}$ (kfci) |  | 205 | 230 | 245 | 215 | 195 | 210 | 187 | 110 | 125 | 115 |

It can be understood from the results in Table I-1 that the examples in which the systems or the magnetic recording media satisfying the relationships gl≦0.3 $\mu$m, 2Dmax≦gl≦10Dmax, 5Dmin≦gl≦100Dmin, and 2t≦gl≦10t in the inductive head, are used are excellent in all of S/N, overwriting erasure rate and D$_{50}$ as compared with comparative examples.

If the gap length of the inductive head in a recording and reproducing system to record signals is known, the largest particle size and the smallest particle size of a ferromagnetic powder for use in a coating-type magnetic recording medium (i.e., a magnetic recording particulate medium) and a magnetic layer thickness which are optimal for the reproduction by an MR head can be known from the functions of a gap length, accordingly optimal magnetic recording and reproduction can be done at all times.

Example II-1

| Preparation of Coating Solution: |  |
|---|---|
| Magnetic coating solution |  |
| Barium ferrite magnetic powder | 100 parts |
| Average particle size: 20 nm |  |
| Tabular ratio: 3 |  |
| In-plane squareness ratio: |  |
| Longitudinal direction: 0.7 |  |
| Perpendicular direction: 0.3 |  |
| Vinyl chloride copolymer | 5 parts |
| MR110 (manufactured by Nippon Zeon Co., Ltd.) |  |
| Polyurethane resin | 3 parts |
| UR 8200 (manufactured by Toyobo Co., Ltd.) |  |
| Hardening agent (polyisocyanate) | 5 parts |
| alpha-Alumina | 5 parts |
| HIT55 (manufactured by Sumitomo Chemical Co., Ltd.) |  |
| Average particle size: 0.2 $\mu$m |  |
| Carbon black | 1 part |
| #50 (manufactured by Asahi Carbon Co., Ltd.) |  |
| Average particle size: 0.08 $\mu$m |  |
| Specific surface area (S$_{HET}$): 23 m$^2$/g |  |
| DBP oil absorption amount: 25 ml/100 g |  |
| pH: 5.5 |  |
| Volatile content: 1.0% |  |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

The components of the above coating solution were blended in a kneader, and then dispersed in a sand mill. The obtained dispersion solution was filtered through a filter having an average pore diameter of 1 $\mu$m, to thereby obtain a coating solution for forming a magnetic layer.

The obtained coating solution was coated on a PET support having a thickness of 62 $\mu$m and a center line average surface roughness of 3 min, and the coated layer was subjected to orientation in the longitudinal direction while the layer was still wet by passing through magnetic intensity of 3,000 G. After drying, the coated layer was subjected to calendering treatment with calenders of 7 stages at 90° C. at linear pressure of 300 kg/cm, thereby a magnetic tape sample was obtained.

Performances of the tape were measured and evaluated by the following methods.

Method of Measurement:

(1) Average Particle Size of the Ferromagnetic Powder

Photographs of 500 particles were taken with a transmission electron microscope (TEM) of 500,000 magnifications and particle sizes were measured by an image analyzer.

(2) Tabular Ratio of the Ferromagnetic Powder

The ratio of the tabular diameter (particle diameter) to the thickness (perpendicular direction of a hexagonal particle) of 4 particle was obtained by the above TEM.

(3) The Squareness Ratio of the Magnetic Layer

The squareness ratio was measured with a vibrating sample magnetometer (a product of Toei Kogyo Co., Ltd.) by saturation magnetic field (Hm) of 10 kOe.

(4) The Thickness of the Magnetic Layer

A sliced piece of the sample was prepared and the average thickness of the magnetic layer was measured by TEM.

(5) Surface Electric Resistance

Measurement was performed using FEC surface electric resistance jig and Digital High Megohm Meter (TR-86110) with applying voltage of 50 V.

(6) Electromagnetic Characteristics

Measurement was performed by pressing a magnetic head against the magnetic tape wound around a rotating drum.

The diameter of the rotating drum was 60 mm, and the relative velocity of head/tape was 10 m/sec.

In recording, an MIG head of saturation magnetization of 1.4T (gl: 0.3 $\mu$m, track width: 18 $\mu$m) was used, and recording current was set at optimal recording current of each tape. An anisotropic type MR head (A-MR) having an elemental thickness of 25 nm and a shield interval of 0.2 $\mu$m was used as a reproduction head.

(7) S/N Ratio

A signal of recording wavelength of 0.2 $\mu$m was recorded and reproduced signal was analyzed by frequency using a spectrum analyzer manufactured by Shibasoku K. K. The ratio of the output of carrier signal (wavelength 0.2 $\mu$m) to the integral noise of the full spectral band was taken as the S/N ratio (dB).

Examples II-2 to II-10 and Comparatives II-1 to II-11

Tape samples were obtained in the same manner as in Example II-1 except that the gap length of the recording head (gl), the ferromagnetic powder and the magnetic layer thickness were changed to those described in Tables II-1 and II-2. The ferromagnetic powder used in all the examples was barium ferrite.

TABLE II-1

| Example No. | Reproducing Head | Recording Head Gap Length gl (μm) | Magnetic Layer Thickness (μm) | Average Particle Size of Ferromagnetic Powder (nm) | Tabular Ratio | Squareness Ratio (longitudinal/ perpendicular) | Magnetic Layer Surface Electrical Resistance (Ω/sq) | Output | Noise | S/N (dB) |
|---|---|---|---|---|---|---|---|---|---|---|
| Example II-1  | MR head | 0.3 | 0.1  | 20 | 3 | 0.7/0.3 | $1 \times 10^9$ | 5  | 5   | 0   |
| Example II-2  | MR head | 0.3 | 0.2  | 20 | 3 | 0.7/0.3 | $1 \times 10^9$ | 7  | 6.5 | 0.5 |
| Example II-3  | MR head | 0.3 | 0.01 | 20 | 3 | 0.7/0.3 | $1 \times 10^9$ | 2  | 0   | 2   |
| Example II-4  | MR head | 0.3 | 0.1  | 10 | 3 | 0.7/0.3 | $1 \times 10^9$ | 3  | −1  | 2   |
| Example II-5  | MR head | 0.3 | 0.1  | 35 | 3 | 0.7/0.3 | $1 \times 10^9$ | 7  | 7   | 0   |
| Example II-6  | MR head | 0.3 | 0.1  | 20 | 2 | 0.7/0.3 | $1 \times 10^9$ | 5  | 5   | 0   |
| Example II-7  | MR head | 0.3 | 0.1  | 20 | 6 | 0.7/0.3 | $1 \times 10^9$ | 7  | 7   | 0   |
| Example II-8  | MR head | 0.3 | 0.1  | 20 | 3 | 0.5/0.5 | $1 \times 10^9$ | 4  | 5   | −1  |
| Example II-9  | MR head | 0.3 | 0.1  | 20 | 3 | 0.8/0.2 | $1 \times 10^9$ | 7  | 5   | 2   |
| Example II-10 | MR head | 0.3 | 0.1  | 20 | 3 | 0.7/0.2 | $1 \times 10^7$ | 5  | 5   | 0   |

TABLE II-2

| Example No. | Reproducing Head | Recording Head Gap Length gl (μm) | Magnetic Layer Thickness (μm) | Average Particle Size of Ferromagnetic Powder (nm) | Tabular Ratio | Squareness Ratio (longitudinal/ perpendicular) | Magnetic Layer Surface Electrical Resistance (Ω/sq) | Output | Noise | S/N (dB) |
|---|---|---|---|---|---|---|---|---|---|---|
| Comparative Example II-1  | Inductive head | 0.3 | 0.1   | 20 | 3 | 0.7/0.3 | $1 \times 10^9$     | 0   | 5   | −5  |
| Comparative Example II-2  | MR head | 0.5 | 0.1   | 20 | 3 | 0.7/0.3 | $1 \times 10^9$     | 1   | 5   | −4  |
| Comparative Example II-3  | MR head | 0.3 | 0.3   | 20 | 3 | 0.7/0.3 | $1 \times 10^9$     | 7   | 10  | −3  |
| Comparative Example II-4  | MR head | 0.3 | 0.005 | 20 | 3 | 0.7/0.3 | $1 \times 10^9$     | −5  | 2   | −7  |
| Comparative Example II-5  | MR head | 0.3 | 0.1   | 5  | 3 | 0.7/0.3 | $1 \times 10^9$     | −20 | 4   | −16 |
| Comparative Example II-6  | MR head | 0.3 | 0.1   | 40 | 3 | 0.7/0.3 | $1 \times 10^9$     | 7   | 10  | −3  |
| Comparative Example II-7  | MR head | 0.3 | 0.1   | 20 | 1 | 0.7/0.3 | $1 \times 10^9$     | 1   | 4   | −3  |
| Comparative Example II-8  | MR head | 0.3 | 0.1   | 20 | 7 | 0.7/0.3 | $1 \times 10^9$     | 7   | 11  | −4  |
| Comparative Example II-9  | MR head | 0.3 | 0.1   | 20 | 1 | 0.7/0.1 | $1 \times 10^9$     | 4   | 7   | −3  |
| Comparative Example II-10 | MR head | 0.3 | 0.1   | 20 | 1 | 0.4/0.6 | $1 \times 10^9$     | 2   | 6   | −4  |
| Comparative Example II-11 | MR head | 0.3 | 0.1   | 20 | 3 | 0.7/0.2 | $1 \times 10^{10}$  | Measurement impossible | Measurement impossible | Measurement impossible |

It can be seen from the results in the above tables that Examples II-1 to II-10 wherein the systems or magnetic recording media according to the present invention were used were less in noise and superior to comparative examples in S/N ratio and output.

The present invention can provide a recording and reproducing system of combining an inductive head and an MR head, by which excellent electromagnetic characteristics, in particular, markedly improved S/N ratio in high density recording region, and excellent durability can be realized. Further, the present invention can provide a coating type magnetic recording medium which is low in noise, excellent in high density characteristics and durability when used in a recording and reproducing system combined with an MR head.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A magnetic recording and reproducing system comprising recording a signal on a magnetic recording medium by an inductive head and reproducing the signal by a magneto resistance head, wherein:

the magnetic recording medium comprises a support having thereon a magnetic layer comprising a ferromagnetic powder and a binder, the gap length of the inductive head is 0.3 μm or less, the maximum particle diameter of the ferromagnetic powder is from 1/10 to 1/2 of the gap length of the inductive head, the minimum particle diameter of the ferromagnetic powder is from 1/100 to 1/5 of the gap length of the inductive head, and the thickness of the magnetic layer is from 1/10 to 1/2 of the gap length of the inductive head.

2. A magnetic recording medium for use in a magnetic recording and reproducing system comprising recording a signal by an inductive head having a gap length of 0.3 μm or less and reproducing the signal by a magnet or resistance head, wherein:

the magnetic recording medium has a magnetic recording layer comprising a ferromagnetic powder and a binder, the maximum particle diameter of the ferromagnetic powder is from 1/10 to 1/2 of the gap length of the inductive head, the minimum particle diameter of the ferromagnetic powder is from 1/100 to 1/5 of the gap length of the inductive head, and the thickness of the magnetic layer is from 1/10 to 1/2 of the gap length of the inductive head.

3. The magnetic recording and reproducing system as in claim 1, wherein the ferromagnetic powder is a ferromagnetic alloy powder comprising Fe having an average long axis length of from 20 to 100 nm and an average acicular ratio of from 3 to 10 as a main component.

4. The magnetic recording medium for use in a magnetic recording and reproducing system as in claim 2, wherein the ferromagnetic powder is a ferromagnetic alloy powder comprising Fe having an average long axis length of from 20 to 100 nm and an average acicular ratio of from 3 to 10 as a main component.

5. The magnetic recording and reproducing system as in claim 1, wherein the ferromagnetic powder is a hexagonal ferrite powder having an average tabular diameter of from 10 to 40 nm and an average tabular ratio of from 3 to 10.

6. The magnetic recording medium for use in a magnetic recording and reproducing system as in claim 2, wherein the ferromagnetic powder is a hexagonal ferrite powder having an average tabular diameter of from 10 to 40 nm and an average tabular ratio of from 3 to 10.

7. The magnetic recording and reproducing system as in claim 1, wherein the magnetic recording medium is a magnetic recording medium wherein a magneto resistance head used for reproduction has an elemental thickness of 30 nm or lens and the minimum particle diameter of the ferromagnetic powder is 1/2 or less of the elemental thickness.

8. The magnetic recording medium for use in a magnetic recording and reproducing system as in claim 2, wherein the magnetic recording medium is a magnetic recording medium wherein a magneto resistance head used for reproduction has an elemental thickness of 30 nm or less and the minimum particle diameter of the ferromagnetic powder is 1/2 or less of the elemental thickness.

9. A magnetic recording and reproducing system comprising recording a signal on a magnetic recording medium by an inductive head and reproducing the signal by a magneto resistance head, wherein:

the magnetic recording medium comprises a support having thereon a magnetic layer comprising a ferromagnetic powder and a binder, the gap length of the inductive head is 0.3 μm or less, the average particle size of the ferromagnetic powder is from 10 to 35 nm, the tabular ratio is from 2 to 6, the squareness ratio of in-plane of the magnetic layer is from 0.5 to 0.9 in the longitudinal direction, and from 0.2 to 0.6 in the thickness direction, and the thickness of the magnetic layer in from 0.01 to 0.2 μm.

10. The magnetic recording and reproducing system as in claim 9, wherein the ferromagnetic powder used in the magnetic recording system is a hexagonal ferrite powder and the magnetic recording and reproducing system uses the ferromagnetic powder.

11. The magnetic recording and reproducing system as in claim 9, wherein the electrical resistance of the surface of the magnetic layer of the magnetic recording medium is $1 \times 10^9$ Ω/sq and the magnetic recording and reproducing system uses the magnetic recording medium.

12. The magnetic recording and reproducing system as in claim 9, wherein the magnetic recording medium is a magnetic recording medium wherein a magneto resistance head used for reproduction has an elemental thickness of 30 nm or less and the minimum particle diameter of the ferromagnetic powder is 1/2 or less of the elemental thickness.

* * * * *